United States Patent
Brewer

[11] 3,913,982
[45] Oct. 21, 1975

[54] WHEEL ASSEMBLY
[76] Inventor: Gilbert G. Brewer, 10108 Fairmont Road, Newbury, Ohio 44065
[22] Filed: Oct. 23, 1974
[21] Appl. No.: 517,369

[52] U.S. Cl. ............................. 301/45; 301/41 R
[51] Int. Cl.² ....................................... B60B 15/00
[58] Field of Search......... 301/40 R, 40 S, 41 R, 43, 301/45–53

[56] References Cited
UNITED STATES PATENTS
1,932,604  10/1933  Roberts................................ 301/46

Primary Examiner—M. Henson Wood, Jr.
Assistant Examiner—D. W. Keen
Attorney, Agent, or Firm—Teare, Teare & Sammon

[57] ABSTRACT

A wheel assembly arranged to provide increased traction upon the occurrence of slippage. The assembly includes tread means mounted on a support assembly for supporting the wheel assembly for movement along a support surface. The support assembly includes a drive wheel section for rotation with the vehicle axle and a support wheel section mounted for rotational movement about the rotational axis of the vehicle axle relative to the drive wheel section. The tread means includes a plurality of tread segments which define a generally circular peripheral configuration for the wheel assembly when the drive wheel section is in the non-displaced position with respect to the support wheel section. The tread segments are supported by the support wheel section for camming engagement with the drive wheel section for changing the orientation of the tread segments to define a generally non-circular peripheral configuration for the wheel assembly upon displacement of the drive wheel section relative to the support wheel section for increasing the traction of the tread assembly on slippery or soft surfaces.

10 Claims, 2 Drawing Figures

WHEEL ASSEMBLY

BACKGROUND OF THE INVENTION

The present invention is related to wheel assemblies, and more particularly to those wheel assemblies which are arranged to provide increased traction when abnormal conditions, such as icy or muddy surfaces, are encountered.

Heretofore, numerous wheel assemblies have been constructed for reducing slippage. For example, some wheel assemblies have employed cleats, or studs, which have been formed integral with the wheel tread to prevent slippage on icy or muddy roads. In such instances, because the cleats or studs form an integral part of the tread, they have not been found to be entirely satisfactory when operated on hard road surfaces during normal conditions. Certain other wheel assemblies have been constructed which have employed cleats or studs which may be selectively deployed when increased traction is desired, but in said assemblies the deployment of the studs is not related to the degree of slippage.

Therefore, it has been found desirable to construct a wheel assembly which will provide for increased traction at any time when slippage occurs, and wherein the traction will be increased or decreased to some extent in relation to the degree of slippage.

SUMMARY OF THE INVENTION

The present invention contemplates providing an improved wheel assembly for increasing the traction upon the occurrence of slippage, and more specifically, will automatically provide increased traction. The wheel assembly includes a support assembly which is adapted for mounting on a vehicle axis. A tread means mounted on the support assembly riding engagement along support surface, such as a road, the ground, or the like. The support assembly includes a drive wheel section which is rotatable with the vehicle axle about its rotational axis, and a support wheel section is mounted for rotational movement about the rotational axis of the vehicle axle for angular displacement relative to the drive wheel section. The tread means includes a plurality of tread segments having arcuately curved contact surfaces which together define a generally circular peripheral configuration for the wheel assembly in the non-displaced position of the drive wheel section. The tread segments are supported by the support wheel section for coacting engagement with the drive wheel section for changing the orientation of the tread segments upon displacement of the drive wheel section relative to the support wheel section so as to define a generally non-circular or saw-tooth peripheral configuration for the wheel assembly for increasing the traction with the support surface. The tread segments are pivotally mounted on the support wheel section, and the support assembly includes cam means which coacts between the tread segments and the drive wheel section for pivoting the tread segments. The cam means comprises a gear connection including a plurality of radially outwardly projecting teeth on the periphery of the drive wheel section, and at least one radially inwardly projecting tooth on each of the tread segments which is interfitted for camming coacting engagement with respective teeth on the drive wheel section so that rotation of the drive wheel section in the clockwise or counterclockwise direction will result in pivotal movement of the tread segment to move the leading edge of the tread segment radially outwardly and the trailing edge radially inwardly to form the aforementioned saw-tooth configuration for the wheel assembly whereby the leading edge can bite into the support surface to increase the traction of the wheel assembly to prevent or reduce slippage of the wheel assembly.

As can be seen from the foregoing, there is provided a simple, yet rugged wheel assembly which automatically provides increased traction when slippage occurs and the wheel begins to spin. More particularly, the wheel assembly operates to provide increased traction, when such is necessary, and is still capable of operation on normal surfaces under good traction conditons.

DESCRIPTION OF THE PREFERRED EMBODIMENTS

Figure 1:
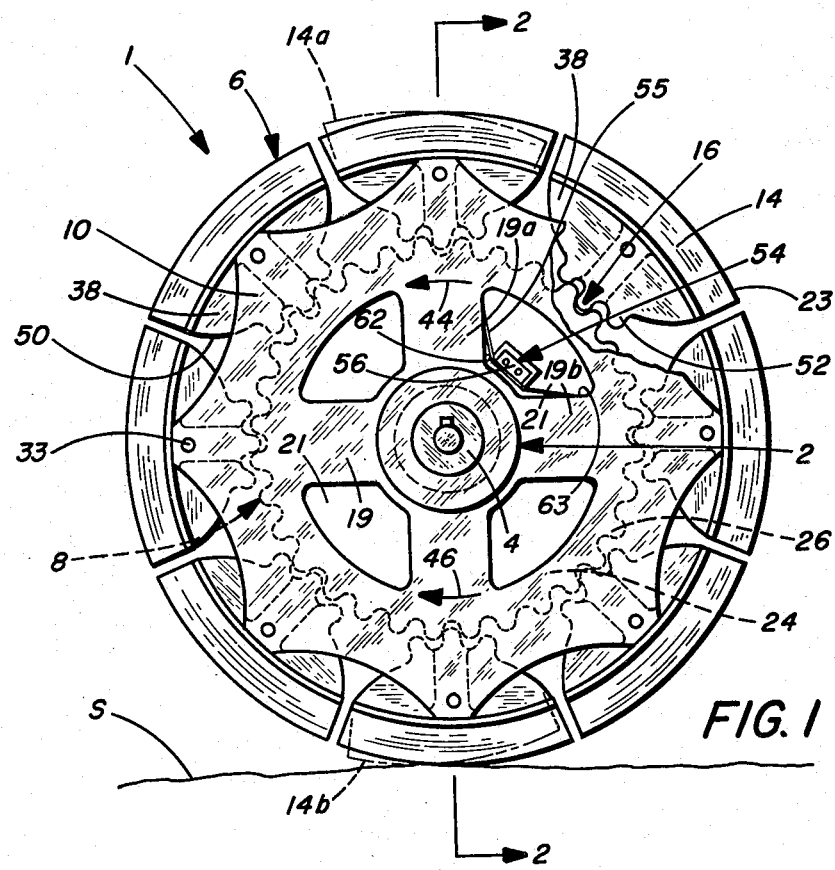
FIG. 1 is a partially cut away, side elevation view of the wheel assembly of the present invention.

The wheel assembly of the present invention is shown, generally at 1 in FIG. 1, being adapted for rolling movement along a support surface S, such as the ground, a road or the like. As shown, the wheel assembly 1 includes a support assembly 2 which is adapted for mounting on a vehicle axle 4 for rotating the entire wheel assembly 1. A tread assembly 6 is supported about the periphery of the support assembly 2, being adapted for riding engagement along the support surface S. The support assembly 2 includes a drive wheel section 8 which is rigidly mounted on the vehicle axle 4 and a support wheel section 10 which is rotatably mounted on the drive wheel section for rotation about the rotational axis of the vehicle axle 4 and for angular displacement relative to the drive wheel section 8. The tread assembly 6 comprises a plurality of tread segments 14 which are supported on the support assembly 2. A cam assembly, generally indicated at 16, is operably connected between the tread segments 14 and the drive wheel section 8 for changing the orientation of the tread segments 14 with respect to one another such that the wheel assembly 1 will have a generally circular configuration in a non-displaced position of the drive wheel section relative to the support wheel section and a generally non-circular configuration when the drive wheel section is displaced relative to the support wheel section.

Figure 2:
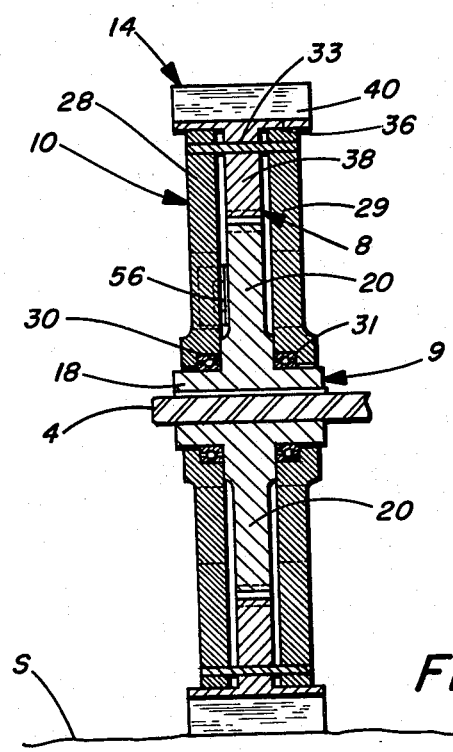
FIG. 2 is a transverse sectional view taken along the line 2—2 of FIG. 1.

More particularly, and referring to FIG. 2, the drive wheel section 8 is provided in the form of a wheel 9 which has a hub portion 18 adapted for mounting on the vehicle axle 4 and a web portion 20 extending radially outwardly from the hub portion 18. The web portion 20 may be of a solid construction having a plurality of radially outwardly extending teeth 26 formed along its periphery which are adapted for coacting engagement with the tread segments 14 as will be described more fully hereinafter.

The support wheel section 10 includes a pair of spaced wheels 28 and 29 which are mounted on opposite sides of the wheel 9. As shown in FIG. 2, the wheels 28 and 29 are mounted for rotation on the hub 18 of the wheel 9 by bearings 30 and 31, respectively, to enable the wheels 28 and 29 to rotate relative to the wheel 9 about the rotational axis of the vehicle axle 4.

As shown, the wheels 28 and 29 extend radially outwardly beyond the periphery of the wheel 9, and a plurality of pins, as at 33, extend between and are supported adjacent the periphery of the wheels 28 and 29 and radially outwardly of the periphery of the wheel 9, being adapted for supporting the tread segments 14 for engagement with the wheel 9 as will be described hereinafter. As shown, the wheels 28 and 29 may be formed with a plurality of web sections 19 defining openings, as at 21, therebetween.

As shown in FIGS. 1 and 2, the tread segments 14 may be of any suitable configuration, but in the forms shown. They are generally T-shaped in transverse cross section (FIG. 2). Each includes a base portion 36 from which an actuating lug 38 projects for coacting engagement with the wheel 9. Each has a shoe 40 supported on its base portion 36, being replaceable to provide increased wear capabilities for the wheel assembly 1. Each of the shoes 40 has an arcuate outer surface 23, which together define a generally circular configuration in the non-displaced position of the tread segment 14. The surfaces 23 may be flat, contoured or lugged, as desired. Each of the mounting lugs 38 is pivotally connected to a respective one of the pins 33 which enables the tread segments 14 to pivot either in a clockwise direction, as indicated at 14a in FIG. 1, when the wheel 9 rotates in a counterclockwise direction, as indicated by the arrow at 44, or pivot in a counterclockwise direction as at 14b in FIG. 1, when the wheel 9 rotates in a clockwise direction as indicated by the arrow 46.

As shown in FIG. 1, the mounting lug 38 includes a generally arcuate inner edge 50 from which one or more teeth 52 project radially inwardly for camming engagement with the teeth 26 on the wheel 9. In the form shown, three such teeth 52 are formed along the edge 50. In this regard, it is to be understood that it is not necessary to provide teeth, such as 26, along the entire periphery of the wheel 9, but rather, only such number of teeth sufficient to interlock the wheel 9 with the tread segments 14. Still further in this regard, it is not necessary that all of the tread segments 14 be pivoted, but rather, the wheel assembly could be arranged such that every second, third or more tread segments 14 could be actuated without departing from the intent of the present invention.

As also shown in FIGS. 1 and 2, a positioning assembly 54 is mounted on the wheel 9 for urging the support wheel section 10 to the non-displaced position. As shown, the positioning assembly 54 comprises a resilient element, such as a leaf spring 55, supported on the wheel 9 for engaging one of the outer wheels, such as the wheel 28. The leaf spring 55 is shown fixedly connected at its center to the wheel 9, such as by a bracket 56 having its opposite ends free to bend. More particularly, one end of the spring 55 is disposed for abutting engagement with one abutment surface on the wheel 28, such as one edge 62 of one of the web sections, as at 19a, to retard movement in a clockwise direction as seen in FIG. 1, and its opposite end disposed for abutting engagement surface on the wheel 28, such as the edge 63 of the adjacent web section 19b. Thus, in sequence, driving power will be transmitted from the shaft 4 to the drive wheel 9, then from one or the other of the edges of the spring 55, depending upon the direction of rotation, to the wheel 28. It is to be understood that another positioning assembly, such as 54, could be mounted on the opposite side of the wheel 9 for engagement with the wheel 29, if desired.

It is to be understood that the wheel assembly described could be employed in applications other than that described herein. For example, the particular construction and operation of the wheel assembly would be readily operable in conjunction with an amphibious craft for use on land and water, or in conjunction with a craft used solely in water.

In a typical operation of the wheel assembly 1 of the present invention, the wheel 9 is held against displacement by a leaf spring 55 so that the tread segments 14 will be in a nondisplaced or non-pivoted position having their arcuate outer surfaces defining a generally circular configuration for the wheel assembly 1. When the vehicle axle 4 is rotated, such as in a clockwise direction as indicated by the arrow 46, there will be a tendency for the wheel 9 to move relative to the wheels 28 and 29 against the force of the ends of the spring 55 due to the gravitational force acting on the supporting tread segment, such as 14b in FIG. 1, such that all of the tread segments 14 will tend to be pivoted, such as in a counterclockwise direction, as indicated by the dotted lines 14b in FIG. 1. The effect of this action is that, when the wheel assembly is operated under conditions where slippage occurs, the wheel 9 would have a tendency to run ahead or be angularly displaced with respect to the wheels 28 and 29, and thus, the tread segments 14 would be simultaneously pivoted about the pins 33, such that the leading edge 64 of each would be disposed for biting engagement with the surface S for increasing the traction of the wheel assembly 1 with the surfaces. Likewise, when the wheel assembly 1 is rotated or spun in the opposite direction, as indicated by the arrow 44, the tread segments 14 will be pivoted such that the opposite edge of the tread segment 65 will become the leading edge for biting contact with the surface as the wheel assembly 1 is rotated.

I claim:
1. A wheel assembly comprising,
   a support assembly adapted for mounting on a vehicle axle, tread means supported by said support assembly for rolling movement along a support surface,
   said support assembly includes,
   a drive wheel section for mounting on said vehicle axle for rotation with the vehicle axle about its rotational axis,
   a support wheel section for mounting with said drive wheel section on said wheel axle for rotational movement about the rotational axis of said vehicle axle and relative to said drive wheel section for angular displacement therebetween,
   said tread means includes a plurality of tread segments which together define a generally circular peripheral configuration for said wheel assembly in the nondisplaced position of said drive wheel section, and
   said support assembly includes expansion means between said drive wheel section and said wheel section, for displacing said tread segments radially outwardly to define a generally non-circular peripheral configuration for said wheel assembly upon displacement of said drive wheel section relative to said support wheel section for increasing the traction of said wheel assembly with the support surface.

2. A wheel assembly in accordance with claim 1, wherein
said tread segments are pivotally mounted on said support wheel section.

3. A wheel assembly in accordance with claim 2, wherein
said expansion means comprises a cam assembly between said tread segments and said drive wheel section for pivoting the tread segments to change their orientation.

4. A wheel assembly in accordance with claim 3, wherein
said cam assembly comprises a gear connection between said tread segment and said drive wheel section.

5. A wheel assembly in accordance with claim 4, wherein
said gear connection includes a plurality of radially outwardly projecting teeth on the periphery of said drive wheel section and at least one radially inwardly projecting tooth on each of said segments for camming coacting engagement with the gear teeth on said drive wheel section.

6. A wheel assembly in accordance with claim 2, wherein
said tread segments are disposed end-to-end relation,
said tread segment includes a leading edge and a trailing edge, and
said cam assembly coacts between said tread segments and said drive wheel section to pivot said tread segments on said support wheel section for moving the leading edge radially outwardly and the trailing edge radially inwardly to form a generally saw-tooth configuration for said wheel assembly in the displaced position of said drive wheel section.

7. A wheel assembly in accordance with claim 1, including positioning means for limiting the angular displacement of said drive wheel section relative to said support wheel section.

8. A wheel assembly in accordance with claim 7, wherein
said positioning means includes a resilient member supported between said drive wheel section and said support wheel section forming a yieldable abutment for limiting the displacement of said drive wheel section.

9. A wheel assembly in accordance with claim 1, wherein
each of said tread segments has a generally arcuate-shaped outer surface for contact with the support surface, and
said outer surfaces together define the circular configuration for said wheel assembly in the non-displaced position of said drive wheel section.

10. A wheel assembly in accordance with claim 1, wherein
said drive wheel section comprises one wheel member having a hub portion adapted for rigid connection to the vehicle axle,
said support wheel section includes a pair of outer wheels mounted for rotation on said hub on opposite sides of said one wheel,
said outer wheels project radially outwardly beyond the periphery of said one wheel,
a plurality of pin members are supported between said outer wheel radially outwardly of said one wheel, and
said tread segments are pivotally mounted on said pin members for pivotal movement in either a clockwise or counterclockwise direction.

* * * * *